No. 614,249. Patented Nov. 15, 1898.
F. A. KERSHAW.
MACHINE FOR GRINDING CUP AND CONE BEARINGS.
(Application filed May 29, 1897.)
(No Model.) 6 Sheets—Sheet 1.
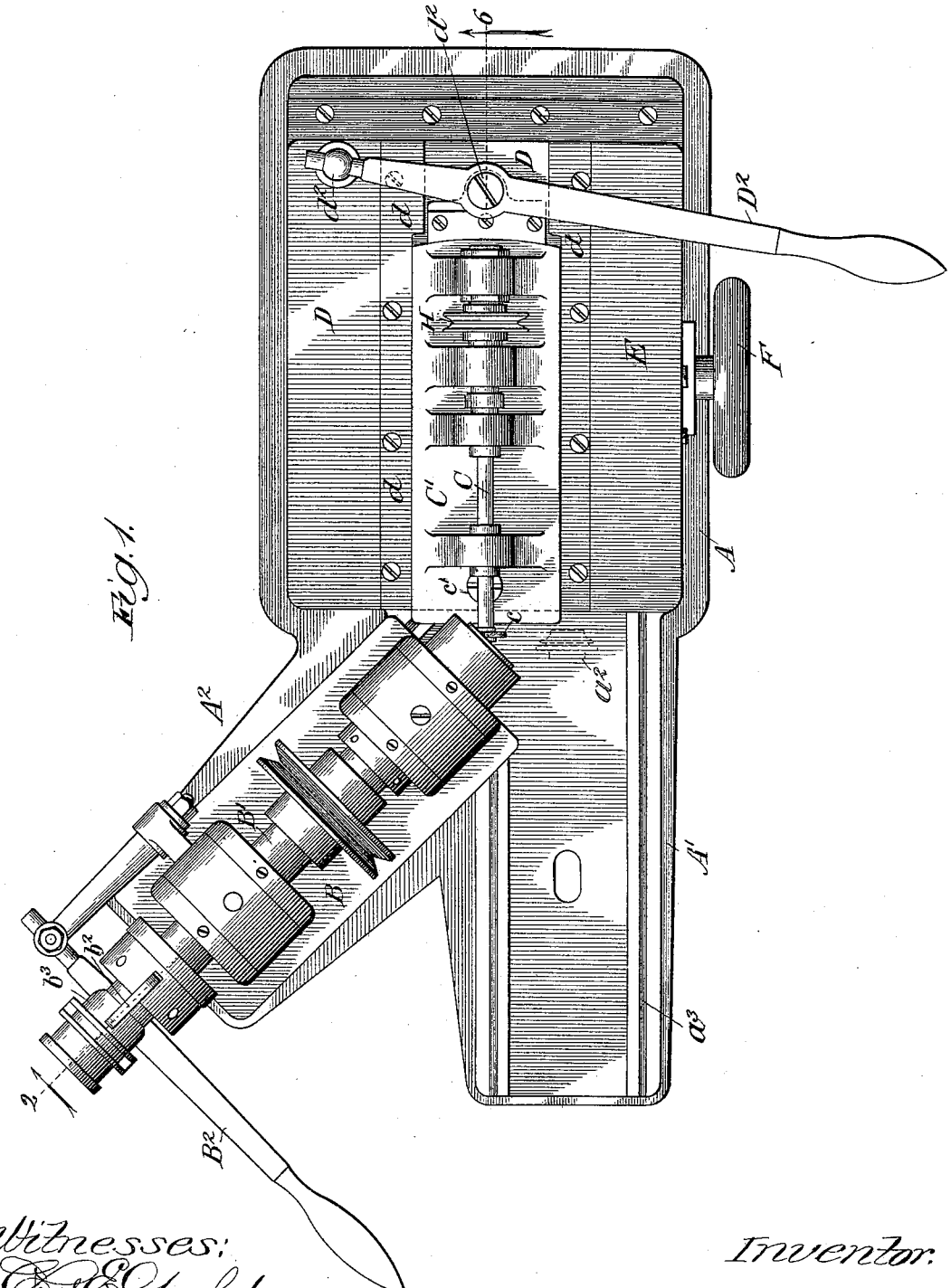

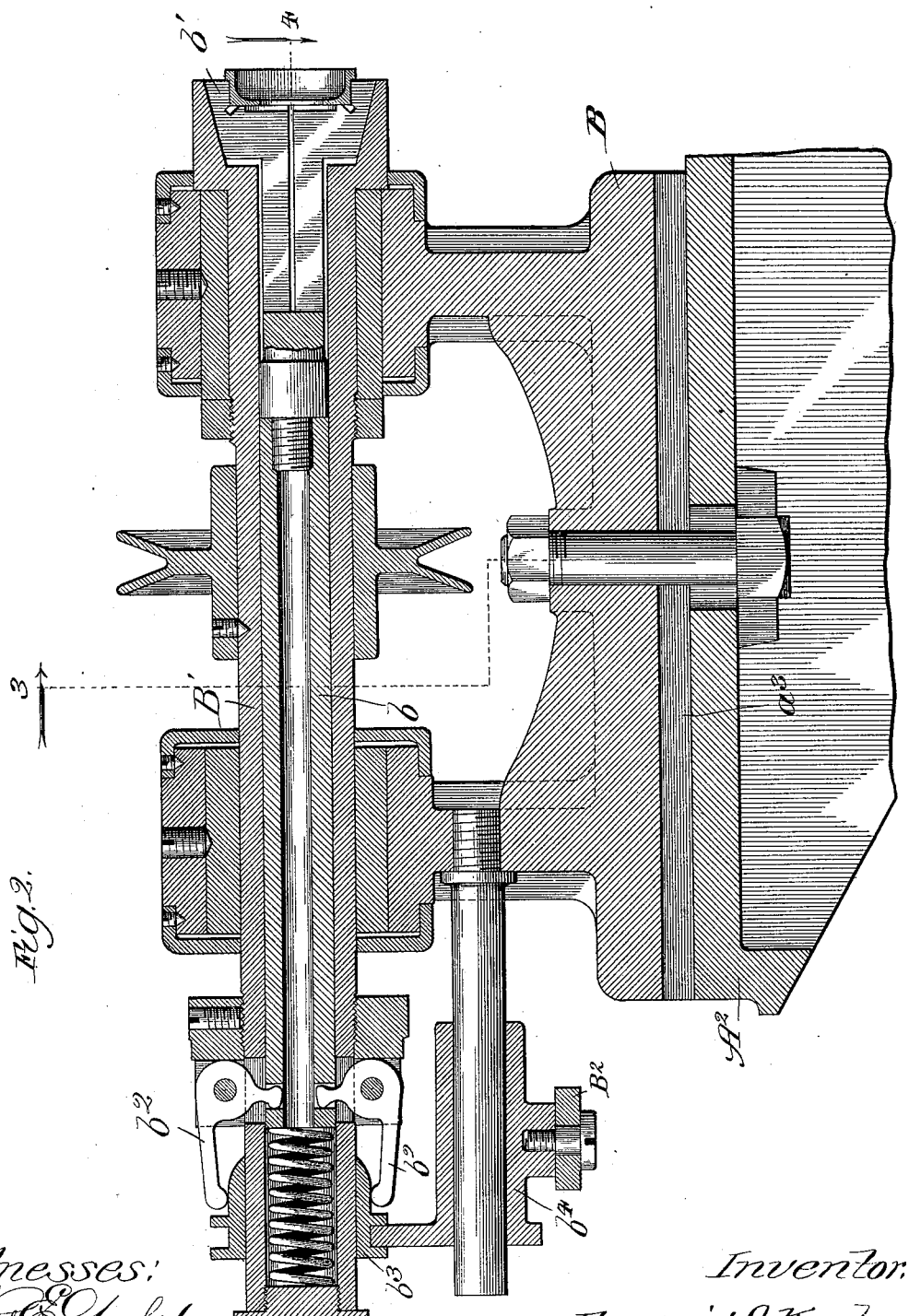

No. 614,249. Patented Nov. 15, 1898.
F. A. KERSHAW.
MACHINE FOR GRINDING CUP AND CONE BEARINGS.
(Application filed May 29, 1897.)
(No Model.) 6 Sheets—Sheet 3.
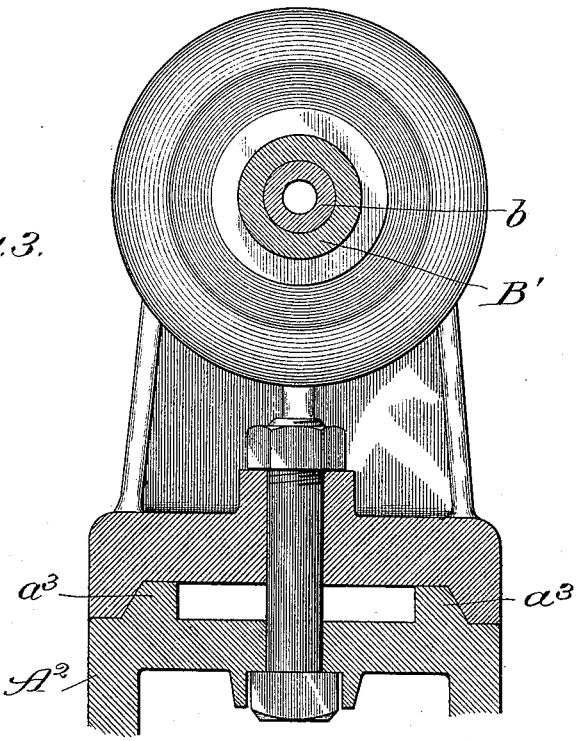
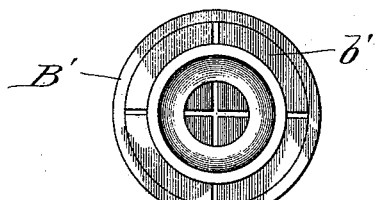
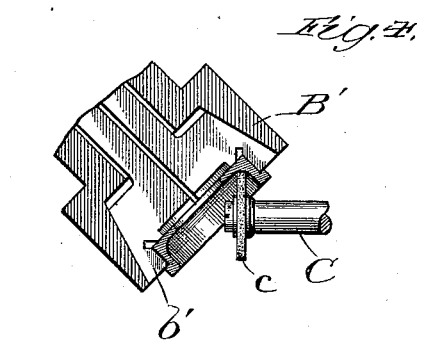
Witnesses:
Inventor,
Francis A. Kershaw,

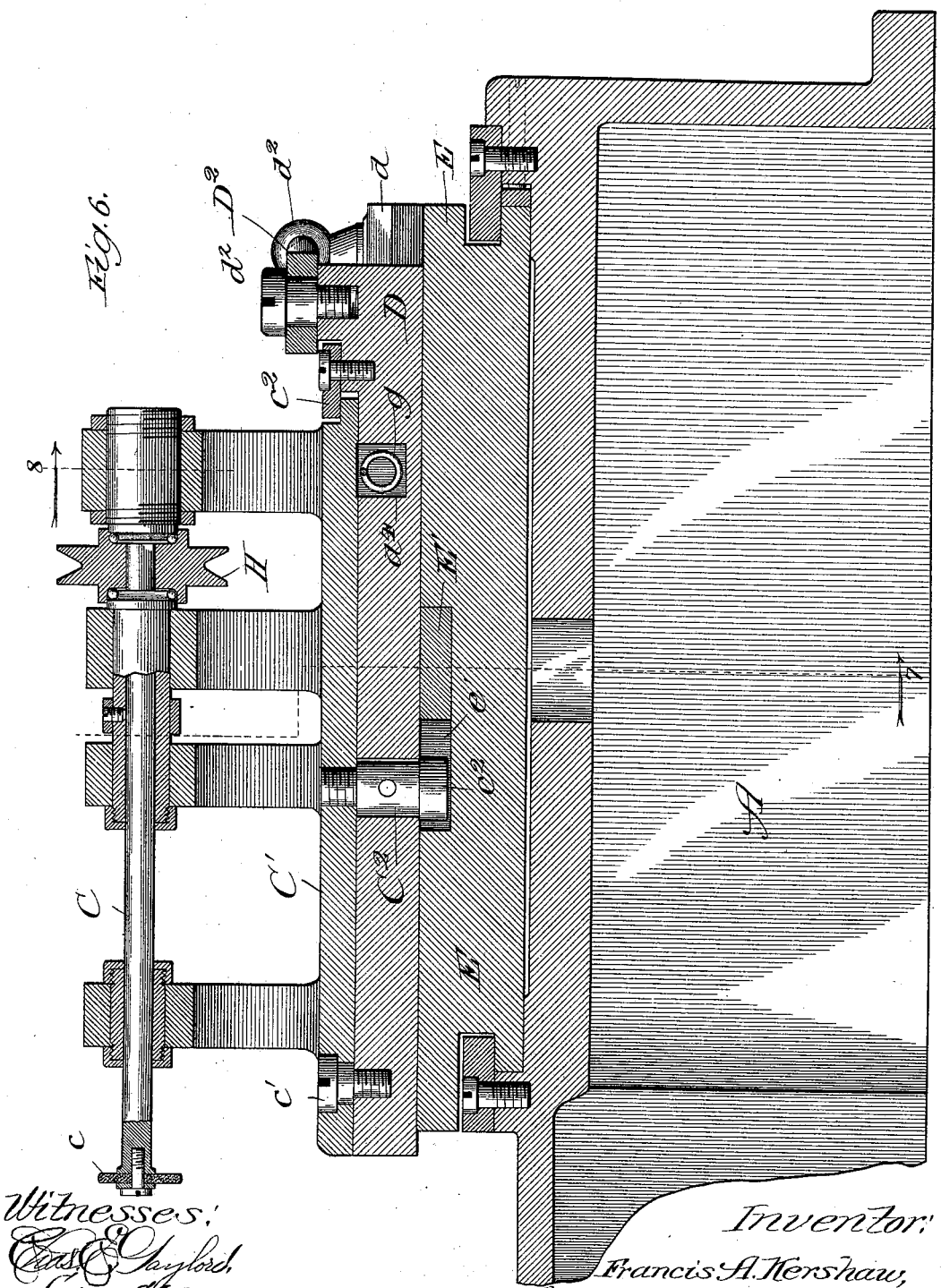

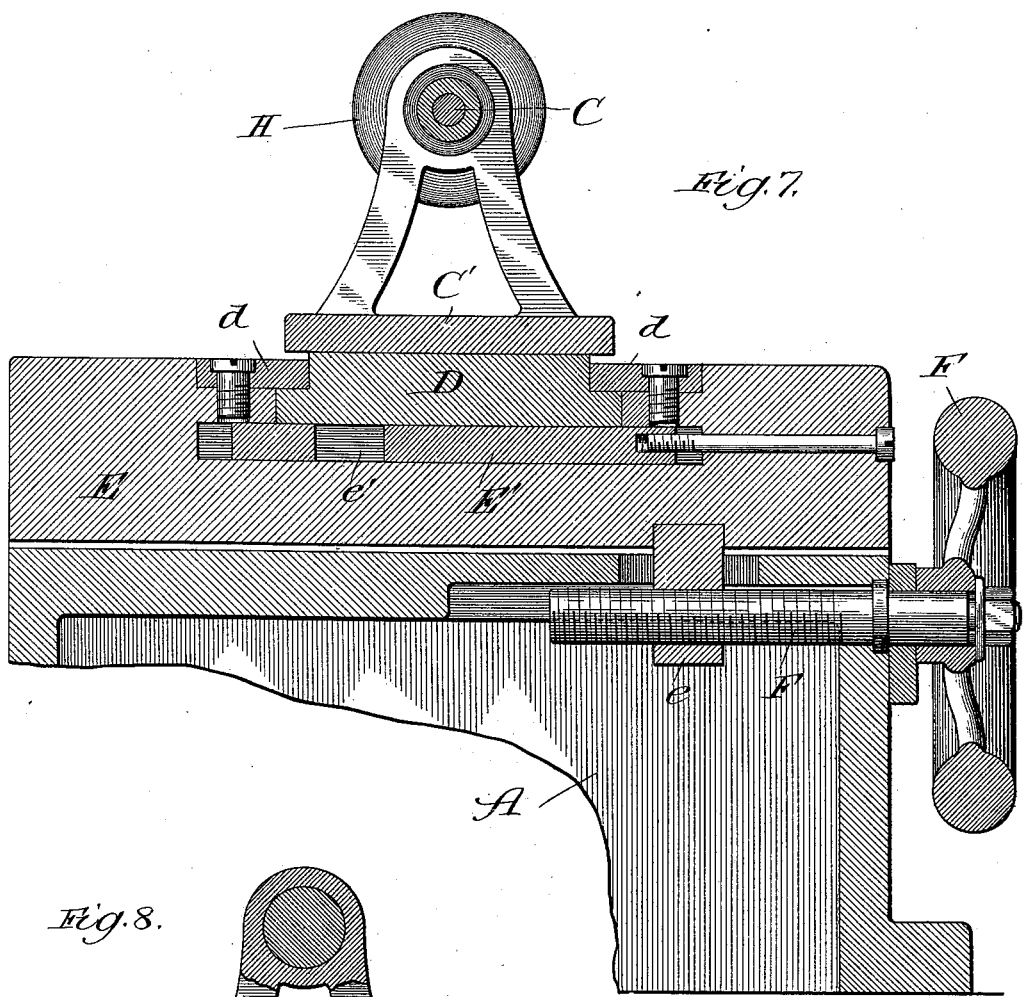

No. 614,249. Patented Nov. 15, 1898.
F. A. KERSHAW.
MACHINE FOR GRINDING CUP AND CONE BEARINGS.
(Application filed May 29, 1897.)
(No Model.) 6 Sheets—Sheet 6.
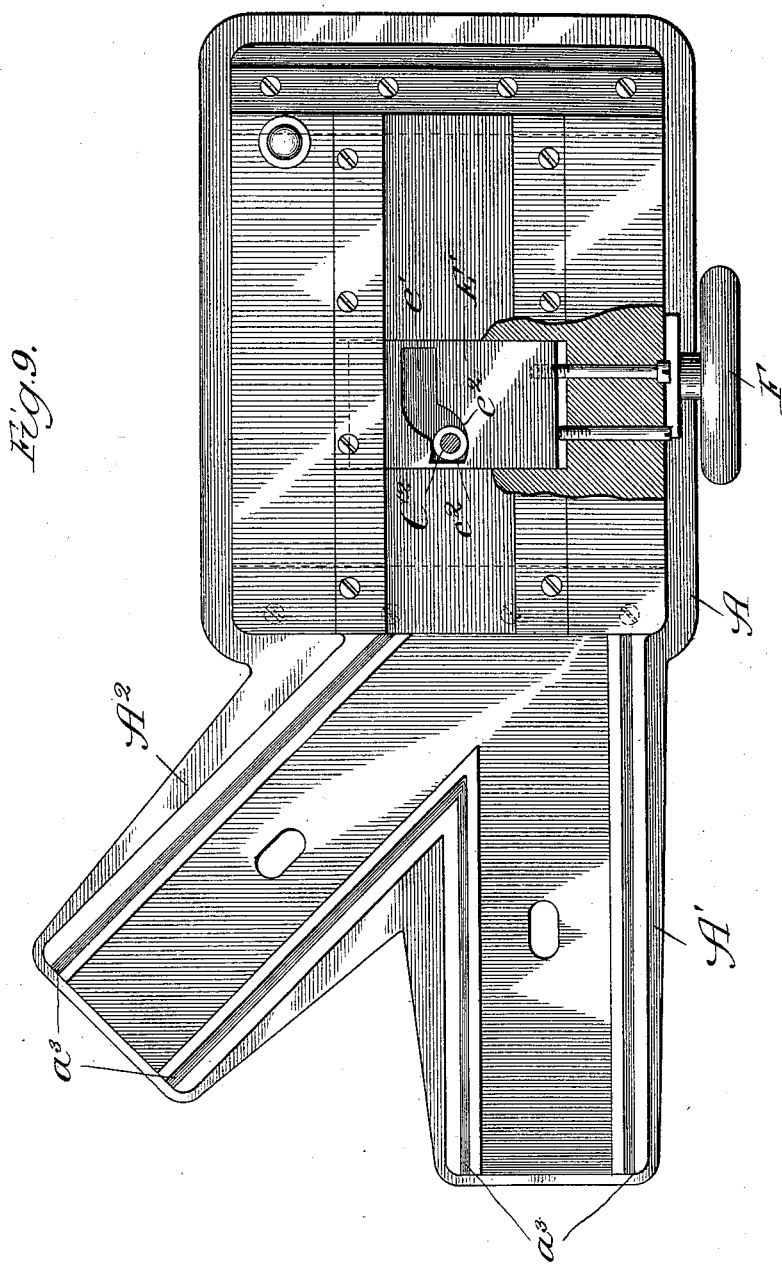

UNITED STATES PATENT OFFICE.

FRANCIS A. KERSHAW, OF KENOSHA, WISCONSIN, ASSIGNOR TO THE STERLING CYCLE WORKS, OF CHICAGO, ILLINOIS.

MACHINE FOR GRINDING CUP AND CONE BEARINGS.

SPECIFICATION forming part of Letters Patent No. 614,249, dated November 15, 1898.

Application filed May 29, 1897. Serial No. 638,793. (No model.)

*To all whom it may concern:*

Be it known that I, FRANCIS A. KERSHAW, a citizen of the United States, residing at Kenosha, in the county of Kenosha and State of Wisconsin, have invented certain new and useful Improvements in Machines for Grinding Cup and Cone Bearings, of which the following is a specification.

My invention relates particularly to machines for grinding the cup and cone bearings of velocipedes, and has for its object the production of a simple, economical, and efficient machine for grinding cup and cone bearings of velocipedes.

The invention consists in the features, combinations, and details of construction hereinafter described and claimed.

In the accompanying drawings, Figure 1 is a plan view of a machine constructed in accordance with my improvements, looking at it from the top; Fig. 2, an enlarged sectional view taken through the head-stock of the machine on line 2 of Fig. 1; Fig. 3, a transverse sectional elevation taken on line 3 of Fig. 2; Fig. 4, a sectional view of the main spindle, spring-chuck, and grinding-spindle, taken on line 4 of Fig. 3; Fig. 5, a front elevation of the main spindle; Fig. 6, an enlarged vertical sectional elevation of the grinding-head, taken on line 6 of Fig. 1. Figs. 7 and 8 are sectional elevations taken on lines 7 and 8 of Fig. 6; and Fig. 9, a plan view of the bed of the machine, looking at it from the top, with a portion thereof broken away.

In the art to which this invention relates it is well known that it is extremely desirable to have the bearing portions of a velocipede that form the ball-races produced in as uniform a manner as possible, and, further, that it is especially essential to have the surfaces that form the ball-race produced in as uniform curvatures as possible, so that when the parts are assembled the same size balls may be used. These requirements are appreciated by those skilled in the art from the fact that if the bearings be produced uniformly and of the correct curvature ordinary unskilled labor can be used to produce the same; and, further, if the grooved surfaces be produced correct in the first instance they are liable to endure for a long period of time.

In constructing a grinding-machine in accordance with my improvements I use a bed portion A, of the desired size and strength, adapted to hold and support the operative mechanisms. This bed portion is provided, preferably, with two extending wing portions $A'$ and $A^2$, $A'$ being used to hold the head-stock B in line with the main bed when grinding the cone-bearings $a^2$, as shown in Fig. 1, while the part $A^2$ is used to hold the head-stock at an angle to the main bed when grinding the cup-bearing, as shown in Fig. 1.

To hold the cup and cone bearings during the process of grinding, I provide the head-stock B, of any of the usual forms of construction, adapted to fit the beveled ways $a^3$ of the bed, the head-stock being provided with the usual main spindle $B'$, which is provided with a draw-in spindle $b$, carrying the usual spring-chuck $b'$, all of which are operated by means of the levers $b^2$, cam $b^3$, and shifting yoke $b^4$, such shifting yoke being operated by means of a handle-lever $B^2$. I lay no special claim to the mechanism of the head-stock, but merely illustrate and describe it as one form of mechanism adapted to hold and rotate the cup and cone bearings during the operation of grinding. The functions and operations of this head-stock, with its draw-in spindle and spring-chuck, are so well known to those skilled in the art that I do not think a further or detail description of it or the means for holding it is necessary.

In illustrating and describing my invention I have arranged them with particular reference to the grinding of the cup-shaped bearings and will first describe the mechanisms combined and arranged to accomplish this result.

To grind the cup-bearing, I arrange the head-stock on the extended bed $A^2$, which is at the proper angle with the axis of the grinding-spindle C, or so that the plane of rotation of the grinding-wheel $c$ is practically at a tangent to the curved surface. I arrange the grinding-spindle in a grinding-head $C'$, which is pivoted, preferably at its front end $c'$, to a secondary sliding base D, so that it may have a vibratory or oscillating motion. The grinding-head is held so as to prevent an upward motion, but permit of an oscillating motion by means of a gib $c^3$ at the rear portion thereof.

The vibrating grinding-head and the sliding base portion are mounted in proper ways $d$ of a transversely-adjustable base E, the adjustable base being provided with a nut $e$, engaged by an adjusting-screw F, arranged in the bed of the machine, the adjusting-screw being for the purpose of moving the grinding-head laterally to the desired position. The adjustable base portion is provided with a slotted cam portion E', the slotted portion $e'$ being of the desired configuration to produce the correct movement of the grinding-head. To move the grinding-head, and particularly the sliding base D, a lever-handle $D^2$ is provided and pivotally mounted at $d^2$ on the adjustable base, so that it can be used to move the sliding base forward. The pivotally-mounted grinding-head is further provided with a stud $C^2$, having a friction-roller $c^2$ at the lower end thereof engaging with the slot of the cam portion. It will thus be seen by the arrangement of parts that during the reciprocating motions of the sliding base the grinding-head is given a compound movement—that is, such a movement that the grinding-wheel describes an arc of a circle. In other words, the grinding-head is given a backward and forward motion and at the same time is swung on its pivot, both of such motions being so combined as to produce a resultant circular or curved motion of the face of the grinding-wheel.

It is desirable in the operation of the grinding-head to provide for uniformity, and in order to accomplish this the head is provided with a pin G (see Fig. 8) and the sliding base with a groove $d^4$, in which a helical spring $g$ is inserted between the pin and the end of the groove, so as to keep the friction-roll of the grinding-head against the surface $e^2$ of the cam-slot.

From the foregoing description of the construction and operation of the parts it will be seen that no matter how much the grinding-wheel wears away the surface of the same will always describe the same curvature and the bearings operated on be produced in a uniform manner.

To grind the cone-bearings, the head-stock is placed on the wing A' and the spring-chuck arranged to hold the cone-bearing as indicated in dotted lines $a^2$ or in line with the axis of the grinding-spindle. The adjustable base is moved in position, so that the opposite surface of the grinding-wheel will contact the curve of the bearing and produce a curve the opposite to that which it produces when grinding the cup-bearing. In all other respects the construction and operation of the parts are the same as those described in connection with the grinding of the cup-bearing.

The grinding-spindle is also provided with a grooved driving-pulley H, which operates to drive the same as efficiently as possible and with the least amount of friction. I have not described the ordinary and well-known mechanisms which are shown in the drawings—such as guides, gibs, set-screws, adjusting-screws, &c.—for the reason that the drawings are plain enough to enable those skilled in the art to readily understand the same, and for the further reason that a detailed description of immaterial parts would only lead to confusion and ambiguity.

While I have described my invention with more or less minuteness as regards details and as being embodied in certain precise forms, I do not desire to be limited thereto unduly or any more than is pointed out in the claims. On the contrary, I contemplate all proper changes in form, construction, and arrangement, the omission of immaterial elements, and the substitution of equivalents, as circumstances may suggest or necessity render expedient.

I claim—

1. In a machine of the class described, the combination of means for holding and rotating a curved bearing portion, a grinding-spindle, a head pivotally mounted for holding such grinding-spindle, a sliding base in which such grinding-head is pivotally mounted, and means for oscillating the grinding-head during the reciprocating motions of the sliding base, substantially as described.

2. In a machine of the class described, the combination of means for holding and rotating a bearing portion, a grinding-spindle, a vibrating or oscillating head in which such grinding-spindle is mounted, a reciprocating base upon which the grinding-head is pivotally mounted, a relatively-fixed base portion provided with a cam, and a projecting stud portion secured to the grinding-head and engaging with the slot of the cam portion whereby the grinding-head is oscillated or vibrated during the reciprocations of the sliding base, substantially as described.

3. In a machine of the class described, the combination of means for holding and rotating a bearing portion, a grinding-spindle, a vibrating or oscillating head in which the spindle is mounted, a reciprocating base portion upon which the grinding-head is mounted, an adjustable base portion provided with a cam portion engaging with a projection on the grinding-head whereby the grinding-head is given a vibratory or oscillating motion during the reciprocations of the sliding base portion, substantially as described.

4. In a machine of the class described, the combination of a base portion provided with two wings at an angle to each other and adapted to hold a head-stock in position, a head-stock adapted to be engaged with either of the wing portions and to be held at an angle to the main bed portion or in line therewith for the purpose of holding and rotating either a cup or cone bearing, a grinding-spindle, a vibrating or oscillating head upon which such spindle is mounted, and means for giving such grinding-head a vibrating or oscillating movement during its forward and backward movements for the purpose of grinding either a cup or cone bearing, substantially as described.

FRANCIS A. KERSHAW.

Witnesses:
EPHRAIM BANNING,
THOMAS F. SHERIDAN.